UNITED STATES PATENT OFFICE.

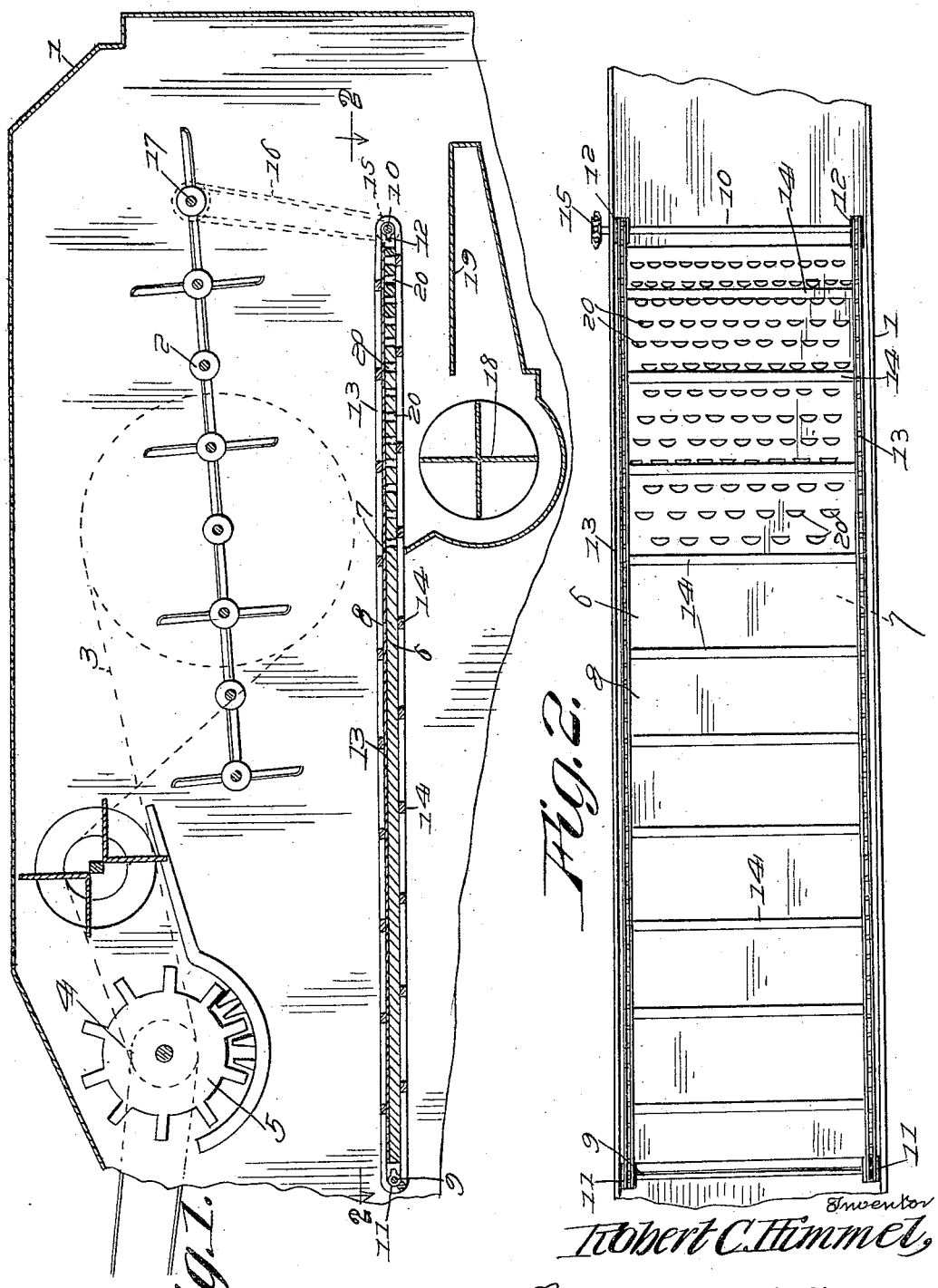

ROBERT C. HIMMEL, OF TOPEKA, ILLINOIS.

ROTARY GRAIN PAN.

1,402,068.     Specification of Letters Patent.     Patented Jan. 3, 1922.

Application filed September 11, 1920. Serial No. 409,595.

*To all whom it may concern:*

Be it known that I, ROBERT C. HIMMEL, a citizen of the United States, residing at Topeka, in the county of Mason and State of Illinois, have invented certain new and useful Improvements in Rotary Grain Pans, of which the following is a specification, reference being had to the accompanying drawings.

It is the purpose of this invention to provide an improved rotary grain pan especially adapted for use in connection with separators of threshing machines for agitating the grain which leaves the straw which is conveyed by the carrier cleaner, and to cause the passage of the grain through perforations in the floor of the pan at a point adjacent the blower and over and upon the blower shoe, so that the dust and motes may be blown therefrom.

Furthermore, the invention aims to provide a device of this kind wherein the floor of the grain pan is covered with sheet iron, and wherein the pan is disposed well up under the cylinder and the cleaner carrier of the threshing machine, extending from the cylinder to a position adjacent to and terminating over the cleaning shoe of the blower, so that when the material leaves the cylinder and is conveyed by the cleaner carrier, the grain will fall upon the pan, and be agitated, and fed toward one end thereof, where it will drop upon the shoe of the blower, and cleaner at the same time.

Still further the invention has for its purpose to provide means travelling over the face of the pan to convey the grain to one end thereof and deliver it to the shoe of the blower.

Additionally the invention aims to provide a pan with perforations at one end, at a position over the shoe of the blower, so that the grain will pass through the perforations in a very thin column, thereby permitting the motes and the dirt to be more efficiently removed by the blower.

Also the perforations decrease in number from one end of the pan, for a distance of substantially one-third of the pan, so that as the grain passes through the perforations, the quantity thereof will be heavier at the end of the pan, than at the point where the perforations begin, thereby facilitating the cleaning of the grain.

A device of this kind is more compact, and necessitates less power to be operated, and will also eliminate the waste, which is more or less considerable in machines heretofore used.

Another purpose of the perforations at one end of the floor of the rotary pan, is to relieve the accumulation of grain at the end of the pan, and to offer the draught of wind the advantage of a very thin column of falling grain, which may be more readily cleaned by the wind from the blower.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a sectional view through a portion of a threshing machine, showing the cleaner carrier, the cylinder beater, and also showing the improved rotary grain pan as applied and constructed in accordance with the invention, and Figure 2 is a plan view of the grain pan.

Referring to the drawings, 1 designates the frame, and 2 denotes the cleaner carrier, which is illustrated, set forth and claimed in the co-pending application of R. C. Himmel, filed eleventh day of September, 1920, Serial No. 409,594. This cleaner carrier is operated through the belt 3 and the pulley connections 4 with the cylinder beater 5.

Disposed well up under the cylinder and the beater carrier is the improved rotary grain pan 6, which comprises a floor 7 covered with sheet metal preferably iron as indicated at 8. This floor extends transversely between and connects the sides of the grain separator space of the threshing machine. Also the floor extends longitudinally of the space and under the cylinder and the cleaner carrier.

Adjacent the ends of the floor are the shafts 9 and 10, which carry the sprockets 11 and 12, about which the sprocket chains 13 travel. These sprocket chains are connected by the transverse bars or rods 14, which may be any suitable shape in cross section, and are designed to travel over the face of the floor when the chains are in motion, thereby agitating the grain, and carrying it to one end of the pan. The shaft 10 carries an additional sprocket 15, about which the sprocket chain 16 travels. This sprocket chain 16 is in turn connected to one of the end shafts 17 of the cleaner carrier 2, and since power is transmitted from the cylinder to the cleaner carrier, motion is imparted to the sprocket chains 13, through the medium of the chain 16.

The blower 18 is disposed under one end of the floor of the grain pan, at a point adjacent one end thereof, and terminates in the usual cleaning shoe 19. The floor of the grain pan from the end adjacent the shaft 10 is provided with perforations 20, decreasing in number from the end of the floor adjacent the shaft 10, for a distance substantially one-third the length of the floor so as not only to relieve the accumulation of grain at one end of the pan, but also to permit of the advantage of a thin column of falling grain at one end of the pan, in order to be more efficiently cleaned by the wind from the blower 18.

The perforations in the latter portion of the grain pan floor are to allow the shelled wheat and the partly liberated berries to fall through into the cleaning shoe, before reaching the rear end, where it would otherwise fall in a mass into the shoe, thereby making complete separation and cleaning impossible, or at least much more difficult. Furthermore this plan or construction causes a distribution of the discharged grain into the cleaning shoe over a larger area, making the operation of the wind more effective.

Also the reason for making the perforations more numerous toward the rear end of the pan is in order to perforate a larger portion of the area as the main force of the current of air is reached. If a larger portion of the area is perforated, the individual perforations must of necessity be smaller.

The use of a device of this kind in connection with a threshing machine, makes it possible to reduce the size of the separator and curtail the power used, and at the same time eliminates waste, which in other devices is very considerable.

The invention having been set forth, what is claimed as new and useful is:—

1. In threshing machines, a grain shoe, a grain pan floor, and means travelling over and in contact with the top and bottom faces of the pan, for conveying the grain dropped upon the floor, to the other end of the pan, where it is delivered to the grain shoe, one end of the floor of the grain pan having transverse rows of perforations extending from the end of the pan over the shoe, for a distance substantially one-third the length of the grain pan, thereby affording means for permitting of the passage of the grain from the pan to and upon the shoe of the blower, the perforations decreasing in number in said transverse rows from the discharge end of the grain pan floor, toward the other end of the grain pan floor.

2. In combination, a grain pan floor, a grain shoe under one end of the pan, the end of the pan over the blower shoe having a plurality of transverse rows of apertures, and means travelling over and in contact with the top and bottom faces of the floor of the pan for carrying the grain and agitating the same to cause the grain to pass through the perforations, said perforations decreasing in number in said transverse rows from the discharge end to a point where the perforations terminate.

3. In threshing machines, a grain shoe, a grain pan floor, one end of the floor of the grain pan having transverse rows of perforations extending from the end of the pan over the shoe for a distance substantially one-third the length of the grain pan, thereby affording means for permitting passage of the grain from the pan to and upon the shoe of the blower, the perforations decreasing in number in said transverse rows from the discharge end of the grain pan floor, toward the other end of the grain pan floor, an endless means travelling in contact with the upper and lower surfaces of the floor for conveying the grain dropped upon the floor, to the other end of the pan, where it is delivered to the grain shoe, said conveying means adapted to engage the grain as it passes through the perforations, assisting in feeding the grain therethrough and toward the support of the shoe.

4. In threshing machines, a grain shoe, a grain pan floor disposed upon a horizontal plane, the floor of which comprising a body, one end of which having transverse rows of perforations and being positioned over the shoe, said perforations being arranged from the end of the pan for a distance substantially one-third the length of the pans, thereby affording means for permitting of the passage of grain from the pan to and upon the shoe of the blower, the perforations decreasing in number in said transverse rows from the discharge end of the grain pan floor, toward the other end of the grain pan floor, and an endless conveyor having its opposing moving parts travelling over and in contact with the upper and under surfaces of the body of said floor, for conveying the grain dropped upon the floor to the other end of the pan, where it is delivered to the grain shoe, said conveyor having transverse members adapted to engage with the grain passing through the perforations, to assist in feeding and pulling the grain through the shoe toward the blower thereof.

In testimony whereof I hereunto affix my signature.

ROBERT C. HIMMEL.